(12) United States Patent
Ozawa (10) Patent No.: US 11,661,525 B2
(45) Date of Patent: May 30, 2023

(54) INKJET INK AND INKJET RECORDING APPARATUS

(71) Applicant: KYOCERA Document Solutions Inc., Osaka (JP)

(72) Inventor: Noriaki Ozawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 125 days.

(21) Appl. No.: 17/351,658

(22) Filed: Jun. 18, 2021

(65) Prior Publication Data

US 2021/0403741 A1    Dec. 30, 2021

(30) Foreign Application Priority Data

Jun. 25, 2020 (JP) .............................. JP2020-109872

(51) Int. Cl.
*C09D 11/40* (2014.01)
*B41J 2/21* (2006.01)
*C09D 11/38* (2014.01)
*C09D 11/037* (2014.01)
*C09D 11/326* (2014.01)
*C09D 11/033* (2014.01)

(52) U.S. Cl.
CPC ............. *C09D 11/40* (2013.01); *B41J 2/2107* (2013.01); *C09D 11/033* (2013.01); *C09D 11/037* (2013.01); *C09D 11/326* (2013.01); *C09D 11/38* (2013.01)

(58) Field of Classification Search
CPC ..... C09D 11/322; C09D 11/38; C09D 11/033; C09D 11/326; B41J 2/2107; B41J 2/2146; B41J 2/155; B41J 2202/21
See application file for complete search history.

(56) References Cited

U.S. PATENT DOCUMENTS

| | | | | |
|---|---|---|---|---|
| 5,258,072 A | * | 11/1993 | Gopalkirshnan | ........ C09K 8/46 405/266 |
| 6,554,891 B1 | * | 4/2003 | Momose | ................ C09D 11/40 106/478 |
| 8,197,921 B2 | * | 6/2012 | Doi | ........................ B41J 2/0057 524/81 |
| 9,217,092 B2 | | 12/2015 | Masuda et al. | |
| 11,001,075 B2 | * | 5/2021 | Gotou | ..................... B41J 2/2146 |
| 2005/0264629 A1 | * | 12/2005 | Fukuda | ................... C09D 11/38 347/100 |
| 2013/0307912 A1 | | 11/2013 | Masuda et al. | |
| 2015/0175780 A1 | * | 6/2015 | Ahrens | ................... C08K 13/02 427/256 |
| 2017/0210918 A1 | * | 7/2017 | Masada | ................. C09D 11/107 |
| 2020/0017703 A1 | * | 1/2020 | Ozawa | ...................... B41J 2/155 |

FOREIGN PATENT DOCUMENTS

JP        2017-206021 A        11/2017

* cited by examiner

*Primary Examiner* — John Zimmermann
(74) *Attorney, Agent, or Firm* — Studebaker & Brackett PC (57) ABSTRACT

An inkjet ink contains a pigment, a pigment dispersion resin, a water-soluble organic solvent, and a polymer nonionic surfactant. The pigment dispersion resin has an acid value of at least 55 mgKOH/g and no greater than 97 mgKOH/g. The polymer nonionic surfactant has a mass average molecular weight of at least 7,000 and no greater than 12,500. An inkjet recording apparatus includes a linehead and a conveyance section which conveys a recording medium. The linehead ejects the above inkjet ink onto the recording medium.

6 Claims, 2 Drawing Sheets

INKJET INK AND INKJET RECORDING APPARATUS

INCORPORATION BY REFERENCE

The present application claims priority under 35 U.S.C. § 119 to Japanese Patent Application No. 2020-109872, filed on Jun. 25, 2020. The contents of this application are incorporated herein by reference in their entirety.

BACKGROUND

The present disclosure relates to an inkjet ink and an inkjet recording apparatus.

In recent years, rapid progress has been made on inkjet recording apparatuses. For example, an inkjet recording apparatus is capable of forming a high-quality image rivaling a silver halide photograph when using photo paper as a recording medium.

An inkjet recording apparatus that includes a linehead has high printing speed among inkjet recording apparatuses. However, such an inkjet recording apparatus that includes a linehead does not perform overprinting, and white lines may therefore occur in a formed image. This phenomenon readily occurs when a solid image is formed on plain paper.

In the inkjet recording apparatus including a linehead, it is effective to use an inkjet ink with excellent permeability to a recording medium (wet spreadability on a recording medium) to prevent occurrence of white lines. An inkjet ink with dynamic surface tension and static surface tension within a specific range is proposed as an example of an inkjet ink with excellent permeability to a recording medium.

SUMMARY

An inkjet ink according to an aspect of the present disclosure contains a pigment, a pigment dispersion resin, a water-soluble organic solvent, and a polymer nonionic surfactant. The pigment dispersion resin has an acid value of at least 55 mgKOH/g and no greater than 97 mgKOH/g. The polymer nonionic surfactant has a mass average molecular weight of at least 7,000 and no greater than 12,500.

An inkjet recording apparatus according to an aspect of the present disclosure includes a linehead and a conveyance section which conveys a recording medium. The linehead ejects the above inkjet ink onto the recording medium.

DETAILED DESCRIPTION

The following describes embodiments of the present disclosure. Note that in the following, a measurement value for volume median diameter ($D_{50}$) refers to a value measured using a dynamic light scattering type particle size distribution analyzer ("ZETASIZER ZS", product of Malvern Instruments Ltd.) unless otherwise stated.

In the following, measurement value for acid value refers to a value measured in accordance with "Japanese Industrial Standard (JIS) K0070:1992" unless otherwise stated. Furthermore, a measurement value for mass average molecular weight (Mw) refers to a value measured using gel permeation chromatography unless otherwise stated. In addition, an octanol/water partition coefficient (Log P) refers to a value measured by the shake flask method described in "Japanese Industrial Standard (JIS) Z7260-107:2000.

In the present specification, dynamic surface tension and static surface tension refer to values measured by methods described in Example or by methods equivalent thereto.

In the present specification, the term "(meth)acryl" is used as a generic term for both acryl and methacryl.

<First Embodiment: Ink>

The following describes an inkjet ink (may be referred to in the following simply as an ink) according to a first embodiment of the present disclosure. The ink of the present disclosure contains a pigment, a pigment dispersion resin, a water-soluble organic solvent, and polymer nonionic surfactant. The acid value of the pigment dispersion resin is at least 55 mgKOH/g and no greater than 97 mgKOH/g. The mass average molecular weight of the polymer nonionic surfactant is at least 7000 and no greater than 12,500.

The ink of the present disclosure is not particularly limited in application, but is preferable as an ink used in an inkjet recording apparatus which includes a linehead as described in the following.

Due to the inclusion of the above features, the ink of the present disclosure has excellent permeability to a recording medium and can prevent the occurrence of sagging (a phenomenon in which the recording medium undulates) in an unprinted portion (a part to which the ink is not applied). The reasons for this are conjectured to be as follows. Known inks have increasingly excellent permeability to a recording medium as the surface tension (initial dynamic surface tension) of an ink droplet decreases directly after ejection (about 10 μs after ejection) from a head. However, a known ink with a low initial dynamic surface tension tends to also have a low static surface tension. When the known ink with a low static surface tension is ejected from a nozzle to form an ink droplet, waves occur in the tail of the ink droplet (part of the ink droplet on a side thereof close to a nozzle). In the ink with a low static surface tension, the waves occurring in the tail of the ink droplet do not stop for a while after the ink droplet lands on the recording medium, and continue to oscillate the surface of the ink droplet. The waves occurring in the tail of the ink droplet as described above cause sagging in the unprinted portion. That is, although the known ink with a low initial dynamic surface tension has excellent permeability to the recording medium, the ink tends to readily cause sagging in the unprinted portion due to low static surface tension. By contrast, the ink of the present disclosure contains a polymer nonionic surfactant. The polymer nonionic surfactant has moderately large molecular weight, and is therefore difficult to move to the gas-liquid interface. As such, the polymer nonionic surfactant can effectively lower the initial dynamic surface tension of the ink of the present disclosure without significantly lowering the static surface tension of the ink of the present disclosure. Furthermore, the ink of the present disclosure contains a pigment dispersion resin with a relatively low acid value. The pigment dispersion resin with a relatively low acid value lowers the initial dynamic surface tension of the ink of the present disclosure due to low hydration force. Through the above, the ink of the present disclosure can simultaneously achieve permeability to a recording medium and prevent the occurrence of sagging in an unprinted portion due to both low initial dynamic surface tension and high static surface tension.

The following describes the ink of the present disclosure in further detail. Note that each component described in the following may be used independently, or two or more of the components may be used in combination.

[Surface Tension]

At a temperature of 25° C., the ink of the present disclosure preferably has a dynamic surface tension at a surface age of 50 milliseconds of at least 38.0 mN/m and no greater than 40.0 mN/m and a static surface tension of at least 34.0 mN/m and no greater than 36.0 mN/m. Note that the dynamic surface tension at a surface age of 50 milliseconds is an index of the initial dynamic surface tension. By setting the dynamic surface tension of the ink of the present disclosure at a surface age of 50 milliseconds to at least 38.0 mN/m, the static surface tension of the ink of the present disclosure can be prevented from excessively decreasing. As a result, the ink of the present disclosure can more effectively prevent the occurrence of sagging in an unprinted portion. By setting the dynamic surface tension of the ink of the present disclosure at a surface age of 50 milliseconds to no greater than 40.0 mN/m, the initial dynamic surface tension of the ink of the present disclosure can be lowered. As a result, the permeability of the ink of the present disclosure to a recording medium can be further improved. By setting the static surface tension of the ink of the present disclosure to at least 34.0 mN/m, the waves occurring in the tail of the ink droplet described above can be readily settled, and the occurrence of sagging in an unprinted portion can be more effectively prevented. By setting the static surface tension of the ink of the present disclosure to no greater than 36.0 mN/m, the initial dynamic surface tension of the ink of the present disclosure can be prevented from increasing. As a result, the permeability of the ink of the present disclosure to a recording medium can be further improved.

[Pigment]

In the ink of the present disclosure, the pigment is contained in pigment particles, for example. The pigment particles are each composed of for example a core containing the pigment and a pigment dispersion resin covering the core. The pigment dispersion resin is present as dispersed in a solvent, for example. From the viewpoint of improving the color density, hue, or stability of the ink of the present disclosure, the $D_{50}$ of the pigment particles is preferably at least 30 nm and no greater than 200 nm, and more preferably at least 70 nm and no greater than 130 nm.

Examples of the pigment include yellow pigments, orange pigments, red pigments, blue pigments, violet pigments, and black pigments. Examples of the yellow pigments include C.I. Pigment Yellow (74, 93, 95, 109, 110, 120, 128, 138, 139, 151, 154, 155, 173, 180, 185, or 193). Examples of the orange pigments include C.I. Pigment Orange (34, 36, 43, 61, 63, or 71). Examples of the red pigments include C.I. Pigment Red (122 or 202). Examples of the blue pigments include C.I. Pigment Blue (15, more specifically 15:3). Examples of the violet pigments include C.I. Pigment Violet (19, 23, or 33). Examples of the black pigments include C.I. Pigment Black (7).

In the ink of the present disclosure, a pigment content ratio is preferably at least 1.0% by mass and no greater than 12.0% by mass, and more preferably at least 4.0% by mass and no greater than 8.0% by mass. By setting the pigment content ratio to at least 1.0% by mass, the image density of an image formed with the ink of the present disclosure can be improved. Furthermore, the fluidity of the ink of the present disclosure can be improved by setting the pigment content ratio to no greater than 12.0% by mass.

[Pigment Dispersion Resin]

The pigment dispersion resin is water-soluble and prevents the agglomeration of the pigment by attaching to the surfaces of the pigment particles.

Examples of the pigment dispersion resin include a copolymer of at least one type of monomer among alkyl (meth)acrylates, styrene, and vinylnaphthalene and at least one type of monomer among (meth)acrylic acid and maleic acid.

The pigment dispersion resin is preferably a resin with a repeating unit derived from (meth)acrylic acid ((meth)acrylic acid unit), a repeating unit derived from alkyl (meth)acrylates (alkyl (meth)acrylate unit), and a styrene unit. In this case, the ratio of the (meth)acrylic acid unit to all repeating units of the pigment dispersion resin is preferably at least 4.5% by mass and no greater than 8.0% by mass. The ratio of the alkyl (meth)acrylate unit to all repeating units of the pigment dispersion resin is preferably at least 35% by mass and no greater than 70% by mass. The ratio of the styrene unit to all repeating units of the pigment dispersion resin is preferably at least 27% by mass and no greater than 60% by mass. The pigment dispersion resin is more preferably a resin with a repeating unit derived from methacrylic acid, a repeating unit derived from methyl methacrylate, a repeating unit derived from butyl acrylate, and a styrene unit.

In the ink of the present disclosure, the content ratio of the pigment dispersion resin is preferably at least 0.5% by mass and no greater than 8.0% by mass, and more preferably at least 1.5% by mass and no greater than 4.0% by mass. By setting the content ratio of the pigment dispersion resin to at least 0.5% by mass, agglomeration of the pigment can be effectively prevented. By setting the content ratio of the pigment dispersion resin to no greater than 8.0% by mass, nozzles can be prevented from clogging.

The acid value of the pigment dispersion resin is at least 55 mgKOH/g and no greater than 97 mgKOH/g, and preferably at least 70 mgKOH/g and no greater than 85 mgKOH/g. By setting the acid value of the pigment dispersion resin to at least 55 mgKOH/g, the static surface tension of the ink of the present disclosure can be prevented from excessively decreasing. As a result, the ink of the present disclosure can prevent the occurrence of sagging in an unprinted portion. By setting the acid value of the pigment dispersion resin to no greater than 97 mgKOH/g, the initial dynamic surface tension of the ink can be lowered. As a result, the ink of the present disclosure can improve permeability to a recording medium.

The acid value of the pigment dispersion resin can be adjusted by changing the monomer used in synthesis of the pigment dispersion resin. For example, by using a monomer (e.g., acrylic acid or methacrylic acid) with an acidic functional group (e.g., a carboxy group) in the synthesis of the pigment dispersion resin, the acid value of the pigment dispersion resin can be increased.

The mass average molecular weight of the pigment dispersion resin is preferably at least 10,000 and no greater than 50,000, and more preferably at least 15,000 and no greater than 30,000. By setting the mass average molecular weight of the pigment dispersion resin to at least 10,000 and no greater than 50,000, the image density of a formed image can be improved while preventing an increase in viscosity of the ink of the present disclosure.

The mass average molecular weight of the pigment dispersion resin can be adjusted by changing the polymerization conditions (e.g., the amount of polymerization initiator, the polymerization temperature, and the polymerization time) of the pigment dispersion resin. Note that the pigment dispersion resin is preferably subjected to equivalent neutralization by a base (e.g., KOH).

[Water-Soluble Organic Solvent]

The water-soluble organic solvent preferably contains a specific water-soluble organic solvent. The octanol/water partition coefficient (Log P) of the specific water-soluble organic solvent is at least −0.5 and no greater than 0.1. The specific water-soluble organic solvent is a solvent with relatively high hydrophobicity. By the specific water-soluble organic solvent being contained in the ink of the present disclosure, the initial dynamic surface tension of the ink of the present disclosure is lowered. As a result, the permeability of the ink of the present disclosure to a recording medium can be further improved.

The following Table 1 shows literature values of the octanol/water partition coefficient of representative water-soluble organic solvents. In Table 1, 3-methyl-1,5-pentanediol, triethylene glycol monobutyl ether, 1,2-pentanediol, diethylene glycol monoethyl ether, and 1,5-pentanediol are given as specific water-soluble organic solvents. The specific water-soluble organic solvent is preferably 3-methyl-1,5-pentanediol, triethylene glycol monobutyl ether, or 1,5-pentanediol.

TABLE 1

|  | LogP |
|---|---|
| 1,2-Octanediol | 0.66 |
| 3-Methyl-1,5-pentanediol | 0.07 |
| Triethylene glycol monobutyl ether | 0.02 |
| 1,2-Pentanediol | 0.00 |
| Diethylene glycol monoethyl ether | −0.15 |
| 1,5-Pentanediol | −0.49 |
| 2-Pyrrolidone | −0.85 |
| 1,3-Propanediol | −1.09 |
| Propylene glycol | −1.40 |
| Glycerin | −1.76 |
| Triethylene glycol | −1.98 |

When the ink of the present disclosure contains a specific water-soluble organic solvent, the content ratio of the specific water-soluble organic solvent in the ink of the present disclosure is preferably at least 15.0% by mass and no greater than 30.0% by mass, and more preferably at least 18.0% by mass and no greater than 23.0% by mass. By setting the content ratio of the specific water-soluble organic solvent to at least 15.0% by mass, the initial dynamic surface tension of the ink of the present disclosure can be further lowered. As a result, the permeability of the ink of the present disclosure to a recording medium can be further improved. By setting the content ratio of the specific water-soluble organic solvent to no greater than 30.0% by mass, the static surface tension of the ink of the present disclosure can be prevented from excessively decreasing. As a result, the ink of the present disclosure can more effectively prevent sagging in an unprinted portion.

The ink of the present disclosure may further contain a water-soluble organic solvent other than the specific water-soluble organic solvent (may be referred to in the following as an additional water-soluble organic solvent). Examples of the additional water-soluble organic solvent include glycol compounds, polyhydric alcohol ether compounds, lactam compounds, nitrogen-containing compounds, acetate compounds, thiodiglycol, glycerin, dimethyl sulfoxide, and a later-described penetrating agent.

Examples of the glycol compounds include ethylene glycol, 1,3-propanediol, propylene glycol, diethylene glycol, triethylene glycol, and tetraethylene glycol.

Examples of the polyhydric alcohol ether compounds include diethylene glycol diethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, and propylene glycol monomethyl ether.

Examples of the lactam compounds include 2-pyrrolidone and N-methyl-2-pyrrolidone.

Examples of the nitrogen-containing compounds include 1,3-dimethylimidazolidinone, formamide, and dimethyl formamide.

Examples of the acetate compounds include diethylene glycol monoethyl ether acetate.

The penetrating agent is an additional water-soluble organic solvent with the property of further improving the permeability of the ink of the present disclosure to a recording medium. Examples of the penetrating agent include 1,2-hexanediol, 1,2-octanediol, 2,4-diethyl-1,5-pentanediol, 2-butyl-2-ethyl-1,3-propanediol, diethylene glycol monoethyl ether, and diethylene glycol monobutyl ether. The penetrating agent is preferably 1,2-octanediol.

The ink of the present disclosure preferably contains at least one of glycerin, 2-pyrrolidone, and the penetrating agent as an additional water-soluble organic solvent.

When the ink of the present disclosure contains glycerin, the content ratio of the glycerin in the ink of the present disclosure is preferably at least 1.0% by mass and no greater than 10.0% by mass, and more preferably at least 3.0% by mass and no greater than 7.0% by mass.

When the ink of the present disclosure contains 2-pyrrolidone, the content ratio of the 2-pyrrolidone in the ink of the present disclosure is preferably at least 1.0% by mass and no greater than 10.0% by mass, and more preferably at least 3.0% by mass and no greater than 7.0% by mass.

When the ink of the present disclosure contains a penetrating agent, the content ratio of penetrating agent in the ink of the present disclosure is preferably at least 0.1% by mass and no greater than 3.0% by mass, and more preferably at least 0.3% by mass and no greater than 1.0% by mass.

[Polymer Nonionic Surfactant]

The mass average molecular weight of the polymer nonionic surfactant is at least 7,000 and no greater than 12,500, and preferably at least 8,000 and no greater than 11,000. By setting the mass average molecular weight of the polymer nonionic surfactant to at least 7000, the static surface tension of the ink of the present disclosure can be prevented from decreasing. As a result, the ink of the present disclosure can prevent the occurrence of sagging in an unprinted portion. By setting the mass average molecular weight of the polymer nonionic surfactant to no greater than 12,500, the initial dynamic surface tension of the ink of the present disclosure can be lowered. As a result, the permeability of the ink of the present disclosure to a recording medium can be improved.

Examples of the polymer nonionic surfactant include a copolymer with a repeating unit derived from polyalkylene glycol alkyl ether (meth)acrylates and a repeating unit derived from alkyl (meth)acrylates (may be referred to in the following as a copolymer (α)).

Examples of the polyalkylene glycol alkyl ether (meth) acrylates include polyethylene glycol methyl ether (meth) acrylate and polypropylene glycol methyl ether (meth)acrylate. The molecular weight of the polyethylene glycol moiety of the polyethylene glycol methyl ether (meth) acrylate is at least 100 and no greater than 300, for example. The molecular weight of the polypropylene moiety of the polypropylene glycol methyl ether (meth)acrylate is at least 80 and no greater than 150, for example. The polyalkylene glycol alkyl ether (meth)acrylate is preferably polyethylene glycol methyl ether acrylate (PEGA) or polypropylene glycol methyl ether acrylate (PPGA).

The content ratio of the repeating unit derived from polyalkylene glycol alkyl ether (meth)acrylate to all repeating units in the copolymer (α) is preferably at least 60.0% by mass and no greater than 95.0% by mass, and more preferably at least 75.0% by mass and no greater than 90.0% by mass.

Examples of the alkyl (meth)acrylates include methyl (meth)acrylate, ethyl (meth)acrylate, propyl (meth)acrylate, butyl (meth)acrylate, hexyl (meth)acrylate, octyl (meth) acrylate, 2-ethylhexyl (meth)acrylate, and lauryl (meth) acrylate. The alkyl (meth)acrylate is preferably methyl acrylate (MMA), lauryl acrylate (LA), or butyl acrylate (BA).

The content ratio of the repeating unit derived from alkyl (meth)acrylates to all repeating units of the copolymer (α) is preferably at least 5.0% by mass and no greater than 40.0% by mass, and more preferably at least 10.0% by mass and no greater than 25.0% by mass.

The copolymer (α) is preferably a copolymer with repeating units derived from monomers of the following combination (1) or repeating units derived from monomers of the following combination (2).

Combination (1): PEGA, PPGA, LA, and MMA
Combination (2): PEGA, PPGA, BA and MMA In the ink of the present disclosure, the content ratio of the polymer nonionic surfactant is preferably at least 0.1% by mass and no greater than 5.0% by mass, and more preferably at least 0.5% by mass and no greater than 2.0% by mass. By setting the content ratio of the polymer nonionic surfactant to at least 0.1% by mass, the permeability of the ink of the present disclosure to a recording medium can be further improved. By setting the content ratio of the polymer nonionic surfactant to no greater than 5.0% by mass, the ink of the present disclosure can more effectively prevent the occurrence of sagging in an unprinted portion.

[Water]

The ink of the present disclosure preferably contains water as a solvent. When the ink of the present disclosure contains water, the content ratio of the water in the ink of the present disclosure is at least 60.0% by mass and no greater than 90.0% by mass, for example.

[Low Molecular Surfactant]

The ink of the present disclosure preferably further contains a low molecular surfactant (e.g., a surfactant with a molecular weight of no greater than 2000). The low molecular surfactant improves the compatibility and dispersion stability of each component of the ink of the present disclosure. Furthermore, the low molecular surfactant further improves the permeability of the ink of the present disclosure to a recording medium. The low molecular surfactant is preferably a low molecular nonionic surfactant.

Examples of the low molecular nonionic surfactant include acetylenediol and an ethylene oxide adduct of acetylenediol. Examples of the acetylenediol include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. The low molecular nonionic surfactant is preferably an ethylene oxide adduct of acetylenediol.

When the ink of the present disclosure contains a low molecular surfactant, the content ratio of the low molecular surfactant in the ink of the present disclosure is preferably at least 0.01% by mass and no greater than 1.0% by mass, and more preferably at least 0.1% by mass and no greater than 0.5% by mass.

[Additional Components]

As necessary, the ink of the present disclosure may further contain a known additive (specific examples include a solution stabilizer, an anti-drying agent, an antioxidant, a viscosity modifier, a pH adjuster, and an antifungal agent).

[Ink Production Method]

The ink of the present disclosure can be produced by for example uniformly mixing a pigment dispersion containing a pigment and a pigment dispersion resin, a water-soluble organic solvent, a polymer nonionic surfactant, and an additional component (e.g., water) added as necessary using a mixer. In the production of the ink of the present disclosure, foreign objects and coarse particles may be removed by using a filter (e.g., a filter with a pore size of 5 μm or less) after the components are uniformly mixed.

(Pigment Dispersion)

The pigment dispersion is a dispersion containing a pigment and a pigment dispersion resin. The dispersion medium of the pigment dispersion is preferably water. The pigment dispersion preferably further contains a low molecular surfactant to increase the dispersibility of pigment particles.

In the pigment dispersion, the $D_{50}$ of the pigment particles containing the pigment and the pigment dispersion resin is preferably at least 50 nm and no greater than 200 nm, and more preferably at least 70 nm and no greater than 130 nm.

The $D_{50}$ of the pigment particles can be measured by for example taking a sample of a solution in which the pigment dispersion has been diluted with ion exchange water 300 times and measuring the sample using a dynamic light scattering type particle size distribution analyzer (e.g., "ZETASIZER ZS", product of Malvern Instruments Ltd.).

The content ratio of the pigment in the pigment dispersion is preferably at least 5.0% by mass and no greater than 25.0% by mass, and more preferably at least 10.0% by mass and no greater than 20.0% by mass. The content ratio of the pigment dispersion resin in the pigment dispersion is preferably at least 2.0% by mass and no greater than 10.0% by mass, and more preferably at least 4.0% by mass and no greater than 8.0% by mass. When the pigment dispersion contains a low molecular surfactant, the content ratio of the low molecular surfactant in the pigment dispersion is preferably at least 0.1% by mass and no greater than 2.0% by mass, and more preferably at least 0.3% by mass and no greater than 1.0% by mass.

The pigment dispersion can be prepared by wet dispersion of the pigment, the pigment dispersion resin, a dispersion medium (e.g., water), and an additional component added as necessary (e.g., a low molecular surfactant) using a media type wet disperser. In wet dispersion using a media type wet disperser, small particle size beads (e.g., beads with a $D_{50}$ of at least 0.5 mm and no greater than 1.0 mm) for example can be used as a medium. The material of the beads is not particularly limited, but is preferably a hard material (e.g., glass or zirconia).

When the pigment dispersion is added in the production of the ink of the present disclosure, the content ratio of the pigment dispersion to all materials of the ink is for example at least 25.0% by mass and no greater than 60.0% by mass.

<Second Embodiment: Inkjet Recording Apparatus>

Next, an inkjet recording apparatus according to a second embodiment of the present disclosure is described. The inkjet recording apparatus of the present disclosure includes lineheads and a conveyance section which conveys a recording medium. The linehead ejects the ink according to the above first embodiment onto the recording medium. The following describes the inkjet recording apparatus according to the present embodiment in detail with reference to the accompanying drawings. Note that the referenced drawings mainly illustrate each constituent element schematically to facilitate understanding thereof. Aspects such as the size and number of the constituent elements illustrated in the drawings may differ in practice for convenience of drawing preparation.

Figure 1:
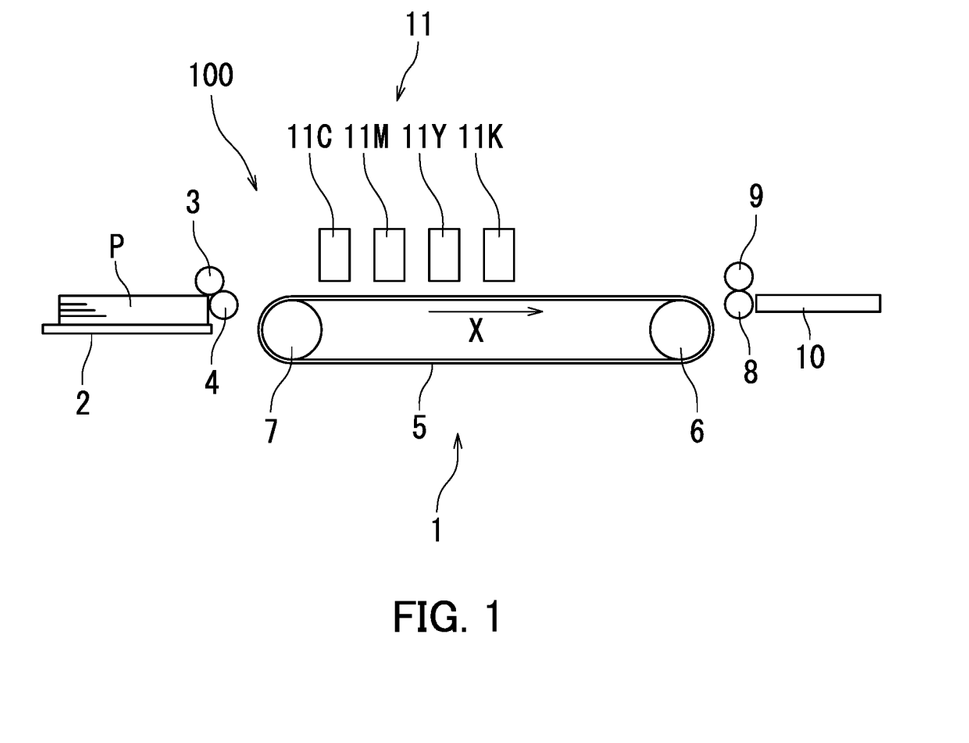
FIG. 1 is a side view of an example of an inkjet recording apparatus according to a second embodiment of the present disclosure.
Figure 2:
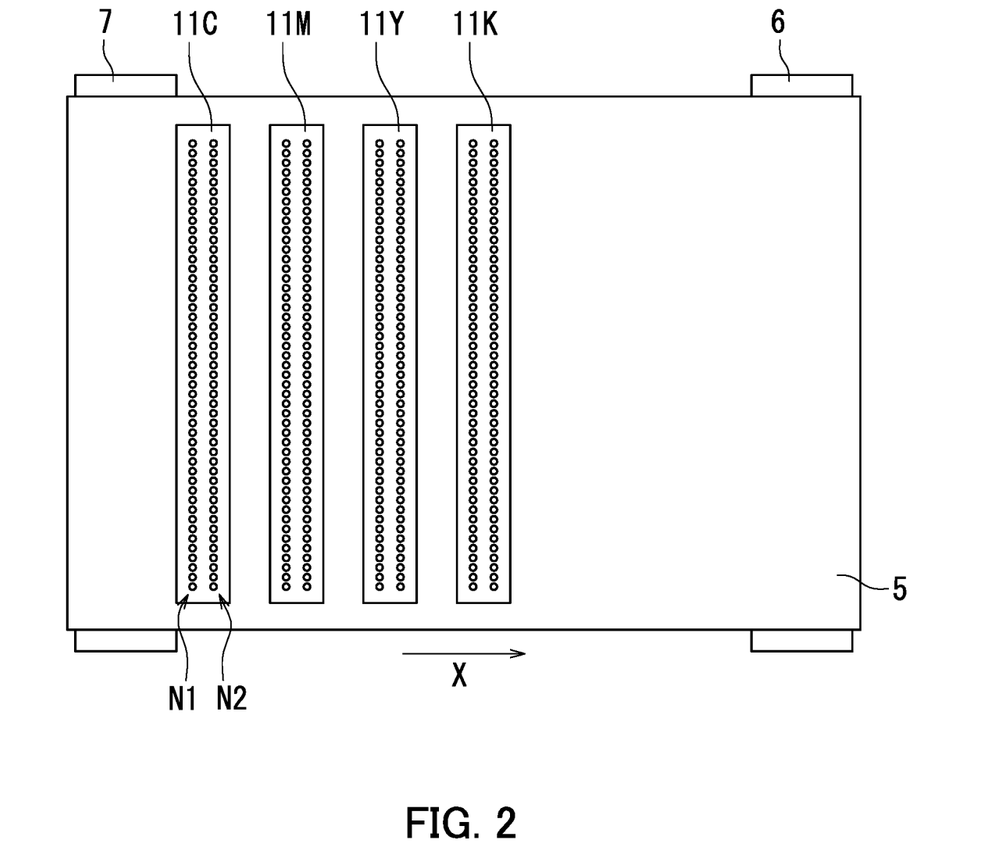
FIG. 2 is a diagram illustrating a conveyor belt of the inkjet recording apparatus illustrated in FIG. 1 as viewed from above.

FIG. 1 is a side view of a configuration of an inkjet recording apparatus 100 serving as an example of the inkjet recording apparatus according to the present embodiment. FIG. 2 is a diagram illustrating a conveyor belt 5 of the inkjet recording apparatus 100 illustrated in FIG. 1 as viewed from above.

As illustrated in FIG. 1, the inkjet recording apparatus 100 mainly includes a conveyance section 1 and a plurality of lineheads 11. The inkjet recording apparatus 100 further includes a paper feed tray 2, a paper feed roller 3, a paper feed driven roller 4, an ejection roller 8, an ejection driven roller 9, and an exit tray 10 in addition to the conveyance section 1 and the lineheads 11.

In the inkjet recording apparatus 100, the paper feed tray 2, the paper feed roller 3 and the paper feed driven roller 4, the conveyance section 1, the ejection roller 8 and the ejection driven roller 9, and the exit tray 10 are arranged in the stated order from upstream to downstream in a conveyance direction X of the recording medium (later-described recording paper P) (may be simply referred to in the following as a conveyance direction X).

The recording paper P is stacked and housed in the paper feed tray 2. The paper feed roller 3 and the paper feed driven roller 4 are arranged in a position adjacent to the paper feed tray 2. The paper feed roller 3 and the paper feed driven roller 4 are pressed against each other at opposite positions. The paper feed roller 3 is rotationally driven in a counter-clockwise direction in FIG. 1. The paper feed driven roller 4 rotates following the rotation of the paper feed roller 3. Through the above, the paper feed roller 3 and the paper feed driven roller 4 feed the recording paper P stacked and housed in the paper feed tray 2 to the conveyance section 1 a sheet at a time starting with an uppermost sheet.

The conveyance section 1 includes a belt drive roller 6 arranged downstream in the conveyance direction X, a belt driven roller 7 arranged upstream in the conveyance direction X, and a conveyor belt 5 which is an endless belt wound around the belt drive roller 6 and the belt driven roller 7. The belt drive roller 6 is rotationally driven in a clockwise direction in FIG. 1. Therefore, the belt drive roller 6 drives the conveyor belt 5. Through the above, the conveyor belt 5 conveys the recording paper P in the conveyance direction X. The belt driven roller 7 rotates following the rotation of the belt drive roller 6 via the conveyor belt 5.

The lineheads 11 are arranged above the conveyor belt 5. The lineheads 11 include a first linehead 11C, a second linehead 11M, a third linehead 11Y, and a fourth linehead 11K. The first to fourth lineheads 11C to 11K are arranged side-by-side in the stated order in the conveyance direction X. The first to fourth lineheads 11C to 11K are arranged at the same height. The first to fourth lineheads 11C to 11K are filled with different respective inks of four colors (cyan, magenta, yellow, and black). Among the inks of four colors filling the first to fourth lineheads 11C to 11K, the ink of at least one color is the ink according to the first embodiment. All the inks of the four colors filling the first to fourth lineheads 11C to 11K are preferably the ink according to the first embodiment. The first to fourth lineheads 11C to 11K form an image (e.g., a color image) on the recording paper P conveyed by the conveyor belt 5 by ejecting the respective inks from a plurality of later-described nozzles.

The ejection roller 8 and the ejection driven roller 9 are pressed against each other at opposite positions. The ejection roller 8 is rotationally driven clockwise in FIG. 1. The ejection driven roller 9 rotates following the rotation of the ejection roller 8. Through the above, the ejection roller 8 and the ejection driven roller 9 eject the recording paper P conveyed from the conveyance section 1 to the exit tray 10. The ejected recording paper P is placed on the exit tray 10.

As illustrated in FIG. 2, the first to fourth lineheads 11C to 11K each include a first nozzle row N1 and a second nozzle row N2 arranged side-by-side in the conveyance direction X. The first and second nozzle rows N1 and N2 are each include a plurality of nozzles lined up in a direction orthogonal to the conveyance direction X (may be referred to in the following as a width direction). The length of the first and second nozzle rows N1 and N2 in the width direction (i.e., the length of an area in which the first to fourth lineheads 11C to 11K are allowed to perform recording in the width direction) is longer than the width of the recording paper P in the width direction. As such, the first to fourth lineheads 11C to 11K can each record an image on the recording paper P conveyed by the conveyor belt 5 in a fixed state. That is, the inkjet recording apparatus 100 is of a single path type and as such does not perform shuttle motion.

Here, a single path type inkjet recording apparatus generally has the advantage of high-speed printing capability. At the same time, a single path type inkjet recording apparatus tends to cause white lines in a formed image because overprinting is not performed as in a multipass type inkjet recording apparatus. This tendency is prominent when the recording medium is plain paper. However, the inkjet recording apparatus 100 uses the ink according to the first embodiment. The ink according to the first embodiment has excellent permeability to a recording medium. As such, even the single path type inkjet recording apparatus 100 can prevent the occurrence of white lines.

The inkjet recording apparatus 100, which is an example of the inkjet recording apparatus according to the present embodiment, is described above with reference to the accompanying drawings. However, the inkjet recording apparatus according to the present embodiment is not limited to the inkjet recording apparatus 100. For example, the number of lineheads included in the inkjet recording apparatus according to the present embodiment may be from one to three or five or more. Furthermore, the inkjet recording apparatus according to the present embodiment may be a multifunction peripheral. In addition, the recording medium may be a material other than recording paper (e.g., fabric) for the inkjet recording apparatus according to the present embodiment. Also, the inkjet recording apparatus according to the present embodiment may be of a multipass type.

The number of nozzles, the interval of the nozzles, and the positional relationship between the nozzles in the first to fourth lineheads 11C to 11K in FIG. 2 can be appropriately set according to the specifications of the apparatus.

Due to the inclusion of the lineheads, the inkjet recording apparatus according to the present embodiment can have a higher printing speed than an inkjet recording apparatus including serial heads. The inkjet recording apparatus according to the present embodiment uses the ink according to the first embodiment, and therefore can prevent the occurrence of white lines and sagging in an unprinted portion.

EXAMPLES

The following describes Examples of the present disclosure. However, the present disclosure is not limited to the following Examples.

In Examples, Mw of the polymer nonionic surfactant and the pigment dispersion resin is measured under the following conditions using gel permeation chromatography ("HLC-8020GPC", product of Tosoh Corporation). A calibration curve was plotted using F-40, F-20, F-4, F-1, A-5000, A-2500, and A-1000 which are TSKgel standard polystyrene produced by Tosoh Corporation, and n-propyl benzene.

(Mass Average Molecular Weight Measurement Conditions)

Columns: "TSKgel SuperMultipore HZ-H", product of Tosoh Corporation (semi-microcolumn with 4.6 mm I.D.× 15 cm)
Number of columns: 3
Eluate: Tetrahydrofuran
Flow rate: 0.35 mL/min.
Sample injection amount: 10 µL
Measurement temperature: 40° C.
Detector: IR detector <Study 1: Polymer Nonionic Surfactant Mass Average Molecular Weight>

First, the mass average molecular weight of polymer nonionic surfactants was studied. The following describes the preparation method of each material used in ink production.

(Preparation of Pigment Dispersion Resin)

A pigment dispersion resin (R-1) with a repeating unit derived from methacrylic acid (MAA unit), a repeating unit derived from methyl methacrylate (MMA unit), a repeating unit derived from butyl acrylate (BA unit), and a repeating unit derived from styrene (ST unit) was prepared. The pigment dispersion resin (R-1) had a mass average molecular weight (Mw) of 20,000 and an acid value of 80 mgKOH/g. The mass ratio of each repeating unit in the pigment dispersion resin (R-1) was "MAA unit:MMA unit:BA unit:ST unit=6.5:30.0:30.0:33.5". The pigment dispersion resin (R-1) was mixed with a potassium hydroxide solution containing potassium hydroxide. The potassium hydroxide solution contained 1.05 times the amount of potassium hydroxide required to neutralize an equal amount of the pigment dispersion resin (R-1). Therefore, the pigment dispersion resin (R-1) was neutralized by an equal amount (105% of, strictly speaking) of KOH. As a result, a pigment dispersion resin solution containing the pigment dispersion resin (R-1) and water was obtained.

(Preparation of Pigment Dispersion (D-1))

In order to achieve the composition shown below in Table 2, a pigment ("RIONOL (registered Japanese trademark) Blue FG-7330", product of TOYOCOLOR, Co. Ltd., component: copper phthalocyanine, color index: Pigment Blue 15:3), the pigment dispersion resin solution described above, "OLFINE (registered Japanese trademark) E1010" (ethylene oxide adduct of acetylenediol), product of Nissin Chemical Industry Co., Ltd. as a low molecular nonionic surfactant, and ion-exchanged water were charged into a vessel. Next, the contents of the vessel were wet dispersed using a media type wet disperser ("DYNO (registered Japanese trademark)-MILL", product of Wiley et Bakkofen (WAB)).

Note that the content ratio of "water" in Table 2 indicates a total content ratio of the ion exchange water charged into the above-described vessel and water contained in the pigment dispersion resin solution (specifically, water contained in the potassium hydroxide solution used to neutralize the pigment dispersion resin and water occurring due to the neutralization reaction between the pigment dispersion resin and the potassium hydroxide).

TABLE 2

| Type | Content ratio [% by mass] |
|---|---|
| Water | 78.5 |
| Pigment dispersion resin (R-1) | 6.0 |
| Pigment | 15.0 |
| Low molecular nonionic surfactant | 0.5 |
| Total | 100.0 |

Continuing, the contents of the above-described vessel was dispersed using zirconia beads (0.5 mm particle diameter) as a media and a wet disperser ("Nano Grain Mill", product of Asada Iron Works Co., Ltd.). The dispersion conditions were a temperature of 10° C., a peripheral speed of 8 m/sec, and a discharge volume of 300 g/min. Through the above, a pigment dispersion (D-1) was obtained.

The volume median diameter ($D_{50}$) of the pigment particles included in the obtained pigment dispersion (D-1) was measured. In detail, the obtained pigment dispersion (D-1) was diluted 300 times with ion exchange water and used as a measurement sample. The $D_{50}$ of the pigment particles in the measure sample was measured using a dynamic light scattering type particle size distribution analyzer ("ZETA-SIZER NANO ZS", product of Malvern Instruments Ltd.). The $D_{50}$ of the pigment particles in the measurement sample was taken to be the $D_{50}$ of the pigment particles contained in the pigment dispersion (D-1). The $D_{50}$ of the pigment particles contained in the pigment dispersion (D-1) was 100 nm.

(Polymer Nonionic Surfactant (S-1))

A copolymer (mass average molecular weight (Mw) 5200) was prepared that included a repeating unit (PEGA unit) derived from polyethylene glycol methyl ether acrylate (molecular weight of polyethylene glycol moiety: 200), a repeating unit (PPGA unit) derived from polypropylene glycol methyl ether acrylate (molecular weight of polypropylene glycol moiety: 100), a repeating unit (LA unit) derived from lauryl acrylate, and a repeating unit (MMA unit) derived from methyl methacrylate. The copolymer was taken to be the polymer nonionic surfactant (S-1). The mass ratio of each repeating unit in the polymer nonionic surfactant (S-1) was "PEGA unit:PPGA unit:LA unit:MMA unit=60.0:23.0:12.0:5.0". The polymer nonionic surfactant (S-1) was water-soluble.

(Polymer Nonionic Surfactants (S-2) to (S-6))

Copolymers with the repeating units and mass average molecular weights shown in the following Table 3 were prepared and taken to be the polymer nonionic surfactants (S-2) to (S-6). The polymer nonionic surfactants (S-2) to (S-6) were all water-soluble. Note that the column titled "repeating unit" in Table 3 indicates inclusion of corresponding repeating units derived from monomers (any of polyethylene glycol methyl ether acrylate (PEGA), polypropylene glycol methyl ether acrylate (PPGA), lauryl acrylate (LA), methyl methacrylate (MMA), and butyl acrylate (BA).

TABLE 3

| Polymer nonionic surfactant | Repeating unit Type | Mass ratio | Mass average molecular weight | Solubility |
|---|---|---|---|---|
| S-1 | PEGA/PPGA/LA/MMA | 60.0/23.0/12.0/5.0 | 5200 | Soluble |
| S-2 | PEGA/PPGA/LA/MMA | 60.0/20.0/12.0/8.0 | 7100 | Soluble |
| S-3 | PEGA/PPGA/LA/MMA | 62.0/20.0/10.0/8.0 | 10300 | Soluble |
| S-4 | PEGA/PPGA/LA/MMA | 50.0/22.0/20.0/8.0 | 12100 | Soluble |
| S-5 | PEGA/PPGA/LA/MMA | 60.0/20.0/11.0/9.0 | 13100 | Soluble |
| S-6 | PEGA/PPGA/BA/MMA | 62.0/20.0/10.0/8.0 | 10800 | Soluble |

[Preparation of Inks (I-1) to (I-6)]

Ion exchange water was charged to a flask equipped with a stirrer ("THREE-ONE MOTOR (registered Japanese trademark) BL-600", product of Shinto Scientific Co., Ltd.). While stirring the contents using the above-mentioned stirrer (stirring speed: 400 rpm), the pigment dispersion (D-1), 2-pyrrolidone, the polymer nonionic surfactant (S-1), 1,2-octanediol as a penetrating agent, and 3-methyl-1,5-pentanediol, and glycerin were added to the flask in the stated order. The ratio of the added amount of each material was as shown below in Table 4.

TABLE 4

| Material | Added amount [% by mass] |
|---|---|
| Pigment dispersion (D-1) | 40.0 |
| 2-Pyrrolidone | 5.0 |
| Polymer nonionic surfactant (S-1) | 1.0 |
| 1,2-Octanediol | 0.5 |
| 3-Methyl-1,5-pentanediol | 25.0 |
| Glycerin | 5.0 |
| Ion exchange water | Residual |
| Total | 100.0 |

To remove foreign objects and coarse particles from the obtained mixed liquid, the mixed liquid was filtered using a filter with a pore size of 5 μm. Through the above, an ink (I-1) was obtained.

Inks (I-2) to (I-6) were prepared by the same method as for the preparation of the ink (I-1) in all respects other than that the type of polymer nonionic surfactant used was changed to those shown below in Table 5.

(Measurement of Surface Tension)

With respect to each of the inks (I-1) to (I-6), the dynamic surface tension at a surface age of 50 milliseconds ($\gamma_{50\,ms}$) and the dynamic surface tension at a surface age of 1000 milliseconds ($\gamma_{eq}$) were measured through the maximum bubble pressure method using a dynamic surface tension measuring device ("BP-100", product of KRUSS). The dynamic surface tension at a surface age of 1000 milliseconds ($\gamma_{eq}$) was deemed to be a surface tension (static surface tension) of the ink in a state in which the dynamic surface tension was at equilibrium. The measurement temperature was set at 25° C.

[Evaluation 1]

With respect to each of the inks (I-1) to (I-6), permeability to a recording medium and the presence or absence of sagging in an unprinted portion were evaluated using the following methods. The evaluation results are shown below in Table 5.

(Permeability)

The evaluation of permeability to a recording medium was performed under the conditions of a 25° C. temperature and a 60% relative humidity. An inkjet recording apparatus (testing apparatus produced by KYOCERA Document Solutions Inc., 600 dpi) was used as an evaluation apparatus. The evaluation apparatus included a piezoelectric inkjet linehead with nozzles (opening aperture: 10 μm). An evaluation target (specifically, one of the inks (I-1) to (I-6)) was set to the linehead of the evaluation apparatus. Next, 10 vertical lines (lines in the sub-scanning direction) were formed on A4-sized plain paper ("Color Copy" (registered Japanese trademark), product of Mondi plc, 90 g/m² basis weight) using the evaluation apparatus. The line width of each vertical line was set to one dot (equivalent to one drop of the ink). The volume per dot (volume per drop) of the ink ejected from the individual nozzles of the linehead was set to 11 pL. Next, the plain paper with the 10 vertical lines formed thereon was dried for 15 hours. Next, the line widths of the 10 vertical lines described above were determined using an optical microscope ("MM-800", product of NIKON CORPORATION). In detail, an average value of the line widths (average width) of the above-described 10 vertical lines was measured using application software attached to the above-described optical microscope. The permeability of the ink to the recording medium was evaluated as good (A) if the average line width was at least 75 μm, and evaluated as poor (B) if the average line width was less than 75 μm.

(Sagging of Unprinted Portion)

The evaluation of presence or absence of the occurrence of sagging in an unprinted portion was performed under environmental conditions of normal temperature and high humidity (25° C. temperature and 80% relative humidity) to inhibit the influence of drying of the ink nozzles. In the above-described evaluation apparatus, ink was purged from the linehead and the linehead was wiped (purge-wipe process). One minute after the purge-wipe process, 1 horizontal line (line in the main scanning direction) was formed on A4-sized glossy paper ("SUPERFINE PAPER", product of SEIKO EPSON CORPORATION) using the evaluation apparatus. The line width of the horizontal line was set to one dot (equivalent to one drop of the ink). The volume per dot (volume per drop) of the ink ejected from the individual nozzles of the linehead was set to 11 pL. Next, the amount of displacement of the horizontal line described above was determined using an optical microscope ("MM-800", product of NIKON CORPORATION). In detail, the maximum distance (amount of displacement) in the sub-scanning direction of each dot forming the above-described horizontal line was measured using the application software attached to the above-described optical microscope. It is shown that as the amount of displacement increased, warping occurred in the above-described horizontal line due to the occurrence of sagging in the unprinted portion. The presence or absence of sagging in the unprinted portion was evaluated as good (A) if the displacement amount was no greater than 20 μm, and was evaluated as poor (B) if the amount of displacement was greater than 20 μm.

TABLE 5

| Ink | | I-1 | I-2 | I-3 | I-4 | I-5 | I-6 |
|---|---|---|---|---|---|---|---|
| Polymer nonionic surfactant | Type | S-1 | S-2 | S-3 | S-4 | S-5 | S-6 |
| | Mw | 5200 | 7100 | 10300 | 12100 | 13100 | 10800 |
| | $\gamma_{50\,ms}$ [mN/m] | 37.0 | 38.0 | 39.2 | 39.8 | 40.2 | 38.9 |
| | $\gamma_{eq}$ [mN/m] | 33.3 | 34.2 | 34.5 | 34.7 | 35.5 | 34.8 |
| Evaluation | Permeability Line width [μm] | 73 | 71 | 73 | 71 | 65 | 71 |
| | DetermiNation | A | A | A | A | B | A |
| | Sagging of unprinted portion Amount of displacement [μm] | 25 | 17 | 18 | 20 | 22 | 16 |
| | Determination | B | A | A | A | B | A |

As shown in Table 5, the inks (I-2) to (I-4) and (I-6) had a polymer nonionic surfactant mass average molecular weight of at least 7,000 and no greater than 12,500. The inks (I-2) to (I-4) and (I-6) had excellent permeability to the recording medium and prevented the occurrence of sagging in the unprinted portion.

By contrast, the ink (I-1) had a polymer nonionic surfactant mass average molecular weight of less than 7000. Because the polymer nonionic surfactant in the ink (I-1) was too high in surfactability, the ink (I-1) had a low static surface tension and did not prevent the occurrence of sagging in the unprinted portion. Furthermore, the ink (I-5) had a polymer nonionic surfactant mass average molecular weight greater than 12,500. Because the polymer nonionic surfactant in the ink (I-5) was too low in surfactability, the ink (I-5) did not decrease in initial dynamic surface tension and had poor permeability to the recording medium. Also, the ink (I-5) did not prevent the occurrence of sagging in the unprinted portion.

<Study 2: Log P of Water-Soluble Organic Solvents>

Next, the octanol/water partition coefficient (Log P) of the water-soluble organic solvents was studied. First, ion exchange water was charged to a flask equipped with a stirrer ("THREE-ONE MOTOR (registered Japanese trademark) BL-600", product of Shinto Scientific Co., Ltd.). While stirring the contents using the above-described stirrer (stirring speed: 400 rpm), the pigment dispersion (D-1), 2-pyrrolidone, the polymer nonionic surfactant (S-3), 1,2-octanediol as a penetrating agent, the water-soluble organic solvents shown below in Table 6, and glycerin were added in the stated order. The ratio of the charged amount of each material was as shown below in Table 7. Through the above, inks (I-7) and (I-8) were prepared. Table 6 also shows the octanol/water partition coefficients (Log P) of the water-soluble organic solvents. Table 6 shows the octanol/water partition coefficients (Log P) of the water-soluble organic solvent used in the ink (I-3) for reference.

TABLE 6

| Ink | Water-soluble organic solvent | LogP |
|---|---|---|
| I-3 | 3-Methyl-1,5-pentanediol (MPD) | 0.01 |
| I-8 | Triethylene glycol monobutyl ether (BTG) | 0.02 |
| I-9 | 1,5-Pentanediol (1,5-PD) | −0.49 |

TABLE 7

| Material | Charged amount [% by mass] |
|---|---|
| Pigment dispersion (D-1) | 40.0 |
| 2-Pyrrolidone | 5.0 |
| Polymer nonionic surfactant (S-3) | 1.0 |
| 1,2-Octanediol | 0.5 |
| Water-soluble organic solvent (refer to Table 6) | 25.0 |
| Glycerin | 5.0 |
| Ion exchange water | Residual |
| Total | 100.0 |

(Measurement of Surface Tension)

For each of the inks (I-7) and (I-8), the dynamic surface tension at a surface age of 50 milliseconds ($\gamma_{50\,ms}$) and the dynamic surface tension at a surface age of 1000 milliseconds ($\gamma_{eq}$) were measured by the same method as described in "Study 1". The measurement results are shown below in Table 8.

[Evaluation 2]

For each of the inks (I-7) and (I-8), the permeability to the recording medium and the presence or absence of sagging in the unprinted portion were evaluated by the same method as described in "Study 1". The evaluation results are shown below in Table 8. Table 8 also shows the measurement results and the evaluation results of the surface tension of the ink (I-3) for reference.

TABLE 8

| Ink | | | I-3 | I-7 | I-8 |
|---|---|---|---|---|---|
| Water-soluble organic solvent | Type | | MPD | BTG | 1,5-PD |
| | LogP | | 0.01 | 0.02 | −0.49 |
| | $\gamma_{50\,ms}$ [mN/m] | | 39.2 | 38.6 | 39.1 |
| | $\gamma_{eq}$ [mN/m] | | 34.5 | 34.7 | 35.2 |
| Evaluation | Permeability | Line width [μm] | 73 | 75 | 73 |
| | | Determination | A | A | A |
| | Sagging in unprinted portion | Amount of displacement [μm] | 18 | 17 | 19 |
| | | Determination | A | A | A |

As shown in Table 8, the inks (I-3), (I-7), and (I-8) contained a specific water-soluble organic solvent with an octanol/water partition coefficient (Log P) of at least −0.5 and no greater than 0.1. The inks (I-3), (I-7), and (I-8) had excellent permeability to the recording medium and prevented the occurrence of sagging in the unprinted portion.

<Study 3: Content Ratio of Specific Water-Soluble Organic Solvent>

Ion exchange water was charged to a flask equipped with a stirrer ("THREE-ONE MOTOR (registered Japanese trademark) BL-600", product of Shinto Scientific Co., Ltd.). While stirring the contents using the above-described stirrer (stirring speed: 400 rpm), the pigment dispersion (D-1), 2-pyrrolidone, the polymer nonionic surfactant (S-3), 1,2-octanediol as a penetrating agent, 3-methyl-1,5-pentanediol (MPD), and glycerin were added in the stated order. The ratio of the charged amount of each material other than 3-methyl-1,5-pentanediol was set as shown below in Table 9. The ratio of the charged amount of 3-methyl-1,5-pentanediol was set as shown below in Table 10. Through the above, inks (I-9) to (I-12) were prepared.

TABLE 9

| Material | Charged amount [% by mass] |
| --- | --- |
| Pigment dispersion (D-1) | 40.0 |
| 2-Pyrrolidone | 5.0 |
| Polymer nonionic surfactant (S-3) | 1.0 |
| 1,2-Octanediol | 0.5 |
| 3-Methyl-1,5-pentanediol | Refer to Table 10 |
| Glycerin | 10.0 |
| Ion exchange water | Residual |
| Total | 100.0 |

(Measurement of Surface Tension)

With reference to each of the inks (I-9) to (I-12), the dynamic surface tension at a surface age of 50 milliseconds ($\gamma_{50\ ms}$) and the dynamic surface tension at a surface age of 1000 milliseconds ($\gamma_{eq}$) were measured by the same method as described in "Study 1". The measurement results are shown below in Table 10.

[Evaluation 3]

With respect to each of the inks (I-9) to (I-12), the permeability to the recording medium and the presence or absence of sagging in the non-printing area were evaluated by the same method as described in "Study 1". The evaluation results are shown below in Table 10.

TABLE 10

| | Ink | | I-9 | I-10 | I-11 | I-12 |
| --- | --- | --- | --- | --- | --- | --- |
| | Content ratio of MPD [% by mass] | | 15.0 | 20.0 | 25.0 | 30.0 |
| | $\gamma_{50\ ms}$ [mN/m] | | 39.8 | 39.2 | 38.5 | 38.2 |
| | $\gamma_{eq}$ [mN/m] | | 36.0 | 35.2 | 34.8 | 34.3 |
| Evaluation | Permeability | Line width [μm] | 75 | 73 | 72 | 73 |
| | | Determination | A | A | A | A |
| | Sagging in unprinted portion | Amount of displacement [μm] | 17 | 19 | 18 | 20 |
| | | Determination | A | A | A | A |

As illustrated in Table 10, the inks (I-9) to (I-12) had a specific water-soluble organic solvent content ratio of at least 15.0% by mass and no greater than 30.0% by mass. The inks (I-9) to (I-12) had excellent permeability to the recording medium and prevented the occurrence of sagging in the unprinted portion.

<Study 4: Acid Value of Pigment Dispersion Resin>

Next, the acid value of pigment dispersion resins was studied. Pigment dispersions (D-2) to (D-6) were prepared by the same method as for the preparation of the pigment dispersion (D-1) in all respects other than the following changes. In the preparation of the pigment dispersions (D-2) to (D-6), respective pigment dispersion resins (R-2) to (R-6) with the repeating units, mass average molecular weights, and acid values shown in below in Table 11 were used as the pigment dispersion resin.

TABLE 11

| Pigment dispersion | Pigment dispersion resin | | | Mass average molecular weight | Acid value [mgKOH/g] |
| --- | --- | --- | --- | --- | --- |
| | Type | Repeating unit | | | |
| | | Type | Ratio | | |
| D-2 | R-2 | MAA/MMA/BA/ST | 4.0/30.0/30.0/36.0 | 20000 | 50 |
| D-3 | R-3 | MAA/MMA/BA/ST | 4.9/35.0/30.1/30.0 | 18000 | 60 |
| D-4 | R-4 | MAA/MMA/BA/ST | 6.5/20.0/20.0/53.5 | 19000 | 80 |
| D-5 | R-5 | MAA/MMA/BA/ST | 7.7/25.0/30.0/37.3 | 20000 | 95 |
| D-6 | R-6 | MAA/MMA/BA/ST | 8.1/36.9/30.0/25.0 | 21000 | 100 |

[Preparation of Inks (I-13) to (I-17)]

Ion exchange water was charged to a flask equipped with a stirrer ("THREE-ONE MOTOR (registered Japanese trademark) BL-600", product of Shinto Scientific Co., Ltd.). While stirring the contents using the above-described stirrer (stirring speed: 400 rpm), a pigment dispersion, 2-pyrrolidone, the polymer nonionic surfactant (S-3), 1,2-octanediol as a penetrating agent, triethylene glycol monobutyl ether, and glycerin were added in the stated order. The ratio of the charged amount of each material was as shown below in Table 12. The type of the pigment dispersion was as shown below in Table 13. Through the above, inks (I-13) to (I-17) were prepared.

TABLE 12

| Material | Charged amount [% by mass] |
| --- | --- |
| Pigment dispersion (refer to Table 13) | 40.0 |
| 2-Pyrrolidone | 5.0 |
| Polymer nonionic surfactant (S-3) | 1.0 |
| 1,2-Octanediol | 0.5 |
| Triethylene glycol monobutyl ether | 23.0 |
| Glycerin | 5.0 |
| Ion exchange water | Residual |
| Total | 100.0 |

(Measurement of Surface Tension)

With respect to each of the inks (I-13) to (I-17), the dynamic surface tension at a surface age of 50 milliseconds ($\gamma_{50\ ms}$) and the dynamic surface tension at a surface age of 1000 ($\gamma_{eq}$) were measured by the same method as described in "Study 1". The measurement results are shown below in Table 13.

[Evaluation 4]

With respect to each of the inks (I-13) to (I-17), the permeability to the recording medium and the presence or absence of sagging in the unprinted portion were evaluated by the same method as described in "Study 1". The evaluation results are shown below in Table 13.

TABLE 13

| | Ink | | I-13 | I-14 | I-15 | I-16 | I-17 |
|---|---|---|---|---|---|---|---|
| Pigment dispersion resin | Pigment dispersion | | D-2 | D-3 | D-4 | D-5 | D-6 |
| | Type | | R-2 | R-3 | R-4 | R-5 | R-6 |
| | Mass average molecular weight | | 20000 | 18000 | 19000 | 20000 | 21000 |
| | Acid value [mgKOH/g] | | 50 | 60 | 80 | 95 | 100 |
| | $\gamma_{50\ ms}$ [mN/m] | | 37.4 | 38.4 | 38.5 | 39.1 | 40.5 |
| | $\gamma_{eq}$ [mN/m] | | 33.6 | 34.3 | 34.6 | 34.8 | 35.4 |
| Evaluation | Permeability | Line width [μm] | 74 | 73 | 71 | 73 | 68 |
| | | DetermiNation | A | A | A | A | B |
| | Sagging in unprinted portion | Amount of displacement [μm] | 25 | 20 | 18 | 18 | 17 |
| | | Determination | B | A | A | A | A |

As shown in Table 13, the inks (I-14) to (I-16) had pigment dispersion resin acid values of at least 55 mgKOH/g and no greater than 97 mgKOH/g. The inks (I-14) to (I-16) had excellent permeability to the recording medium and prevented the occurrence of sagging in the unprinted portion.

By contrast, the ink (I-13) had a pigment dispersion resin acid value of less than 55 mgKOH/g. Because a pigment dispersion resin with an excessively low acid value (a pigment dispersion resin with an excessively low hydration force) was used, the ink (I-13) had low static surface tension and did not prevent the occurrence of sagging in the unprinted portion. Furthermore, because the ink (I-17) with a pigment dispersion resin acid value exceeding 97 mgKOH/g used a pigment dispersion resin with an excessively high acid value (a pigment dispersion resin with an excessively high hydration force), the ink (I-17) did not decrease in initial dynamic surface tension and had poor permeability to the recording medium.

<Study 5: Type of Pigment>

Next, the sort of influence brought by changes to the pigment of the inks was studied. A pigment dispersion (D-7) was prepared by the same method as in the preparation of the pigment dispersion (D-1) in all aspects other than the following change. Carbon black ("MA100", product of Mitsubishi Chemical Corporation) was used as a pigment in the preparation of the pigment dispersion (D-7).

[Preparation of Ink (I-18)]

Ion exchange water was charged to a flask equipped with a stirrer ("THREE-ONE MOTOR (registered Japanese trademark) BL-600", product of Shinto Scientific Co., Ltd.). While stirring the contents using the above-described stirrer (stirring speed: 400 rpm), the pigment dispersion (D-7), 2-pyrrolidone, the polymer nonionic surfactant (S-3), 1,2-octanediol as a penetrating agent, triethylene glycol monobutyl ether, and glycerin were added in the stated order. The ratio of the charged amount of each material was as shown below in Table 14.

TABLE 14

| Material | Charged amount [% by mass] |
|---|---|
| Pigment dispersion (D-7) | 40.0 |
| 2-Pyrrolidone | 5.0 |
| Polymer nonionic surfactant (S-3) | 1.0 |
| 1,2-Octanediol | 0.5 |

TABLE 14-continued

| Material | Charged amount [% by mass] |
|---|---|
| Triethylene glycol monobutyl ether | 23.0 |
| Glycerin | 5.0 |
| Ion exchange water | Residual |
| Total | 100.0 |

(Measurement of Surface Tension)

With respect to the ink (I-18), the dynamic surface tension at a surface age of 50 milliseconds ($\gamma_{50\ ms}$) and the dynamic surface tension at a surface age of 1000 milliseconds ($\gamma_{eq}$) were measured by the same method as described in "Study 1". The measurement results are shown below in Table 15.

[Evaluation 5]

For the ink (I-18), the permeability to the recording medium and the presence or absence of sagging in the unprinted portion were evaluated by the same method as described in "Study 1". The evaluation results are shown below in Table 15.

TABLE 15

| | Ink | | I-18 |
|---|---|---|---|
| | Pigment | | Carbon black |
| | $\gamma_{50\ ms}$ [mN/m] | | 38.6 |
| | $\gamma_{eq}$ [mN/m] | | 33.6 |
| Evaluation | Permeability | Line width [μm] | 73 |
| | | Determination | A |
| | Sagging in unprinted portion | Amount of displacement [μm] | 18 |
| | | Determination | A |

As shown in Table 15, the ink (I-18) containing carbon black as a pigment had excellent permeability to the recording medium and prevented the occurrence of sagging in the unprinted portion like an ink such as the inks (I-2) to (I-4) and (I-6) which contained Pigment Blue 15:3 as a pigment.

To summarize the foregoing, inks that contained a pigment, a pigment dispersion resin, a water-soluble organic solvent, and a polymer nonionic surfactant, had a pigment dispersion resin acid value of at least 55 mgKOH/g and no greater than 97 mgKOH/g, and had a polymer nonionic surfactant mass average molecular weight of at least 7,000 and no greater than 12,500, had excellent permeability to the recording medium and prevented the occurrence of sagging in the unprinted portion.

What is claimed is:

1. An inkjet ink comprising:
a pigment, a pigment dispersion resin, a water-soluble organic solvent, and a polymer nonionic surfactant, wherein
the pigment dispersion has an acid value of at least 55 mgKOH/g and no greater than 97 mgKOH/g,
the polymer nonionic surfactant is a copolymer with a repeating unit derived from polyalkylene glycol alkyl ether (meth)acrylate and a repeating unit derived from alkyl ester (meth)acrylate, and
the polymer nonionic surfactant has a mass average molecular weight of at least 10,300 and no greater than 12,500.

2. The inkjet ink according to claim 1, wherein
at a temperature of 25° C.,
a dynamic surface tension of the inkjet ink at a surface age of 50 milliseconds is at least 38.0 mN/m and no greater than 40.0 mN/m, and
a static surface tension of the inkjet ink is at least 34.0 mN/m and no greater than 36.0 mN/m.

3. The inkjet ink according to claim 1, wherein
the water-soluble organic solvent contains a specific water-soluble organic solvent, and
the specific water-soluble organic solvent has an octanol/water partition coefficient (Log P) of at least −0.5 and no greater than 0.1.

4. The inkjet ink according to claim 3, wherein
the specific water-soluble organic solvent has a content ratio of at least 15.0% by mass and no greater than 30.0% by mass.

5. The inkjet ink according to claim 4, wherein
the specific water-soluble organic solvent includes 3-methyl-1,5-pentanediol, triethylene glycol monobutyl ether, or 1,5-pentanediol.

6. An inkjet recording apparatus comprising:
a linehead and a conveyance section which conveys a recording medium, wherein
the linehead ejects the inkjet ink according to claim 1 onto the recording medium.

* * * * *